US012318262B2

(12) United States Patent
Fang et al.

(10) Patent No.: US 12,318,262 B2
(45) Date of Patent: Jun. 3, 2025

(54) FORCE APPLYING DEVICE FOR ORTHODONTIC TREATMENT

(71) Applicant: SHANGHAI NINTH PEOPLE'S HOSPITAL, SHANGHAI JIAOTONG UNIVERSITY SCHOOL OF MEDICINE, Shanghai (CN)

(72) Inventors: Bing Fang, Shanghai (CN); Lei Huang, Shanghai (CN); Wenxuan Shi, Shanghai (CN); Lunguo Xia, Shanghai (CN); Lingjun Yuan, Shanghai (CN); Ning Zhao, Shanghai (CN); Peijun Lu, Shanghai (CN); Zheng Hu, Shanghai (CN); Rongjing Chen, Shanghai (CN); Qingling You, Shanghai (CN); Guohua Tang, Shanghai (CN); Xiaogang Pan, Shanghai (CN); Yiming Yang, Shanghai (CN); Fengting Chu, Shanghai (CN); Quan Yu, Shanghai (CN); Fang Ji, Shanghai (CN); Jun Zhao, Shanghai (CN); Qiping Feng, Shanghai (CN); Chenjie Yang, Shanghai (CN)

(73) Assignee: SHANGHAI NINTH PEOPLE'S HOSPITAL, SHANGHAI JIAOTONG UNIVERSITY, Shanghai (CN)

( * ) Notice: Subject to any disclaimer, the term of this patent is extended or adjusted under 35 U.S.C. 154(b) by 574 days.

(21) Appl. No.: 17/553,028

(22) Filed: Dec. 16, 2021

(65) Prior Publication Data

US 2022/0175495 A1   Jun. 9, 2022

Related U.S. Application Data

(63) Continuation-in-part of application No. PCT/CN2020/131163, filed on Nov. 24, 2020.

(30) Foreign Application Priority Data

Dec. 2, 2019  (CN) .......................... 201922122294.6

(51) Int. Cl.
*A61C 7/36*  (2006.01)

(52) U.S. Cl.
CPC ..................................... *A61C 7/36* (2013.01)

(58) Field of Classification Search
CPC ........................................................ A61C 7/36
See application file for complete search history.

(56) References Cited

U.S. PATENT DOCUMENTS 3,798,773 A * 3/1974 Northcutt ............. A61C 1/0092
433/19
5,829,975 A * 11/1998 Gold ........................ A61C 7/36
433/19

(Continued)

FOREIGN PATENT DOCUMENTS

CN      206391019 U  *  8/2017
CN      209661829 U      11/2019

(Continued)

*Primary Examiner* — Heidi M Eide
(74) *Attorney, Agent, or Firm* — FISHERBROYLES, LLP; Roger L. Browdy; Ronni S. Jillions

(57) ABSTRACT

Disclosed is a force applying device for orthodontic treatment being elastically expandable and configured to generate a restoring force as an orthodontic force for an orthodontic treatment when compressed. The force applying device comprises a first element and a second element capable of moving relative to each other along a first axis. The force applying device for orthodontic treatment is compressed when the first and second elements move towards each other along the first axis. A first arm extends laterally from a first end of the first element away from the second element. A first connecting part of a first connector is fitted over the first arm. A second connecting part of the (Continued)

first connector is to be fitted over a button fixed on a first jaw to connect the first element to the first jaw. Both the first and the second connecting parts are toroidal in shape.

12 Claims, 6 Drawing Sheets

(56) References Cited

U.S. PATENT DOCUMENTS

| | | | | |
|---|---|---|---|---|
| 6,162,051 A * | 12/2000 | Brehm | ..................... | A61C 7/36 433/19 |
| 2002/0025502 A1 * | 2/2002 | Williams | ................. | A61C 7/10 433/7 |
| 2004/0110109 A1 * | 6/2004 | Forster | ..................... | A61C 7/36 433/19 |
| 2007/0020577 A1 * | 1/2007 | Corcoran | ................. | A61C 7/36 433/19 |
| 2012/0028208 A1 * | 2/2012 | Cleary | ..................... | A61C 7/22 433/19 |
| 2013/0130190 A1 * | 5/2013 | Lewis | ..................... | A61C 7/00 433/18 |
| 2014/0057222 A1 * | 2/2014 | Kumar | ..................... | A61C 7/20 433/19 |
| 2014/0272755 A1 * | 9/2014 | Radmall | ................. | A61C 7/00 433/14 |
| 2015/0327957 A1 * | 11/2015 | Faust | ...................... | A61C 7/20 433/24 |
| 2016/0000531 A1 * | 1/2016 | Radmall | ................. | A61C 7/36 433/17 |
| 2016/0175074 A1 * | 6/2016 | Cleary | ..................... | A61C 7/18 433/19 |
| 2016/0220331 A1 * | 8/2016 | Johnston | ................. | A61C 7/18 |
| 2016/0302891 A1 * | 10/2016 | Paehl | ..................... | A61C 7/282 |
| 2017/0007442 A1 * | 1/2017 | Dietz | ..................... | A61F 5/566 |
| 2019/0110866 A1 * | 4/2019 | Nagai | ..................... | A61C 7/08 |

FOREIGN PATENT DOCUMENTS

| | | | | |
|---|---|---|---|---|
| CN | 211325746 U | 8/2020 | | |
| CN | 211750174 U | 10/2020 | | |
| CN | 211834951 U | 11/2020 | | |
| DE | 29818960 U1 * | 1/1999 | ............... | A61C 7/36 |
| WO | WO-2012150494 A1 * | 11/2012 | ............... | A61C 7/36 |
| WO | WO-2013096090 A1 * | 6/2013 | ............... | A61C 7/20 |
| WO | WO-2018016258 A1 * | 1/2018 | ............... | A61C 7/08 |
| WO | WO-2018074307 A1 * | 4/2018 | ............... | A61C 7/08 |

* cited by examiner

A-A

FORCE APPLYING DEVICE FOR ORTHODONTIC TREATMENT

FIELD OF THE APPLICATION

The present application generally relates to a force applying device for orthodontic treatment, particularly a force applying device for orthodontic treatment that is able to indicate the force applied.

BACKGROUND

Malocclusion, as a common oral problem, is usually caused by factors such as genetic factor and environmental factor. In most cases, it occurs during development of jaw in childhood, and it seriously affects oral function and health and aesthetic appearance.

At present, means for treating malocclusion mainly include interceptive treatment and surgical treatment. Surgical treatment corrects serious skeletal malocclusion with surgical method after development ends, and there is certain surgical risk. Interceptive treatment corrects malocclusion by a simple method in early stage, to stop deterioration of the malocclusion and direct maxillofacial development back to normal.

Currently, Herbst appliance is commonly used in interceptive treatment. However, the Inventors of the present application discovered that the force applying device of a conventional Herbst appliance has the following drawbacks: (1) the force applying device has no means for indicating force applied, and it is difficult to determine whether a force generated in a treatment meets requirements of a corresponding treatment plan; (2) the positions of mounting parts are not adjustable, the tolerance for mounting error is small, and it is very difficult to ensure that a treatment will be implemented completely according to a corresponding treatment plan; (3) when fully extended, the length is not adjustable, as a result, the force is not adjustable if the mounting parts remain fixed, thereby limiting the scope of application of the force applying device; (4) the force applying device is fixed on jaws with screws, which is inconvenient to operate in oral cavity.

In view of the above, it is necessary to provide a new force applying device for orthodontic treatment.

SUMMARY

One aspect of the present application provides a force applying device for orthodontic treatment, which is elastically expandable and is configured to generate a restoring force as an orthodontic force for an orthodontic treatment when compressed, where the force applying device for orthodontic comprises a first element and a second element capable of moving relative to each other along a first axis, the force applying device for orthodontic treatment is compressed when the first element and second element move towards each other along the first axis, a first arm extends laterally from a first end of the first element, which first end is away from the second element, a first connecting part of a first connector is fitted over the first arm, where the first connector comprises a first connecting part and a second connecting part which are toroidal in shape, and the second connecting part of the first connector is to be fitted over a button fixed on a first jaw, to connect the first element to the first jaw.

In some embodiments, the first connecting part and second connecting part of the first connector may be twisted relative to each other about a longitudinal axis of the first connector by a first angle.

In some embodiments, the first angle is greater than or equal to 30° and less than or equal to 90°.

In some embodiments, an enlarged part is formed at, the end of the first arm to prevent the first connecting part from disengaging from the first arm.

In some embodiments, a second arm extends outward from the second element, a first connecting part of a second connector is fitted over the second arm, the second connector comprises a first connecting part and a second connecting part which are toroidal in shape, and the second connecting part of the second connector is to be fitted over a button fixed on a second jaw opposite to the first jaw, to connect the second element to the second jaw.

In some embodiments, the first connecting part and second connecting part of the second connector may be twisted relative to each other about a longitudinal axis of the second connector by a second angle.

In some embodiments, the second angle is greater than or equal to 30° and less than or equal to 90°.

In some embodiments, an enlarged part is formed at the end of the second arm to prevent the second connecting part from disengaging from the second arm.

In some embodiments, the first element is provided with a scale marking a desired range of applied force.

In some embodiments, the first element is a sliding rod, the second element comprises an inner sleeve, an outer sleeve and a spring, where the spring is received in the inner sleeve and is configured to be pushed and compressed by the sliding rod, the outer sleeve is fitted over the inner sleeve, the outer sleeve is connected to the inner sleeve by a screw thread connection, the second arm extends outward from the outer sleeve, and the sliding rod is partially received in the inner sleeve.

In some embodiments, the transverse size of a first section of the sliding rod, which is close to the inner sleeve, is smaller than the inner diameter of the spring, the first section can run through the spring, and a transverse size of a second section of the sliding rod, which is away from the inner sleeve, is greater than the inner diameter of the spring such that the sliding rod is able to push the spring to compress it.

In some embodiments, both ends of the inner sleeve are open such that the first section of the sliding rod can go through the inner sleeve.

In some embodiments, a scale is provided on the inner sleeve as reference for adjusting relative position between the inner sleeve and the outer sleeve.

In some embodiments, a step is formed on both ends of a cavity of the inner sleeve for receiving the spring, to retain the spring within the cavity.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

DETAILED DESCRIPTION OF ILLUSTRATED EMBODIMENTS

In the following detailed depiction, reference is made to the accompanying drawings, which form a part thereof. Exemplary embodiments in the detailed description and figures are only intended for illustration purpose and not meant to be limiting the protection scope of the present application. Inspired by the present application, those skilled in the art can understand that other embodiments may be utilized and other changes may be made to the depicted embodiments, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

One aspect of the present application provides a force applying device for orthodontic treatment, for applying orthodontic forces in orthodontic treatments to achieve treatment goals.

Inspired by the present application, it is understood that besides Herbst appliance, the force applying device for orthodontic treatment of the present application may be used for any other suitable orthodontic treatment.

Figure 1A:
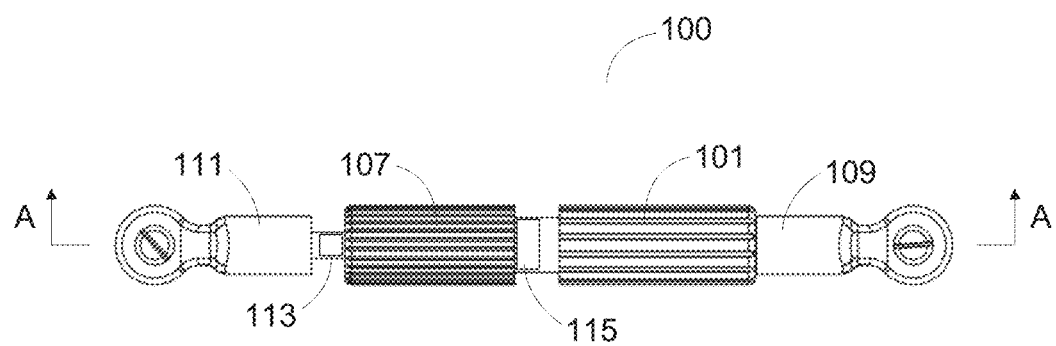
FIG. 1A schematically illustrates a force applying device for orthodontic treatment according to one embodiment of the present application.
Figure 1B:
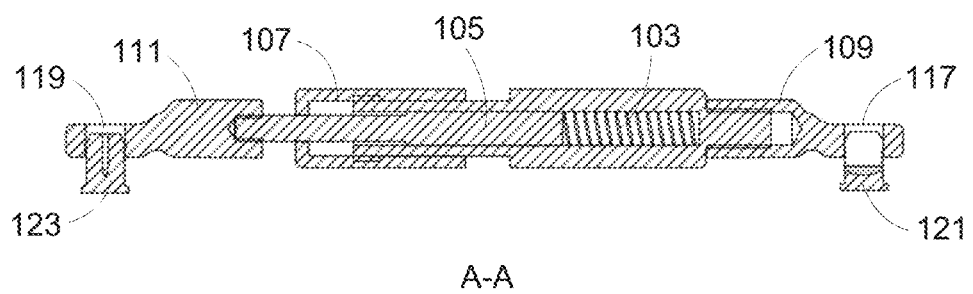
FIG. 1B schematically illustrates a cross-sectional view of the force applying device for orthodontic treatment shown in FIG. 1A along the line A-A.

Referring to FIG. 1A, it schematically illustrates a force applying device 100 for orthodontic treatment according to one embodiment of the present application. Then referring to FIG. 113, it schematically illustrates a cross-sectional view of the force applying device 100 for orthodontic treatment shown in FIG. 1A along line A-A.

The force applying device 100 for orthodontic treatment comprises a sleeve 101, a spring 103, a sliding rod 105, a stop cap 107, mounting parts 109 and 111, and buttons 121 and 123.

The sleeve 101 receives the spring 103 and the sliding rod 105. One end of the sleeve 101 is closed and the other end is open. The spring 103 is located between the closed end of the sleeve 101 and the sliding rod 105. As such, when the sliding rod 105 moves toward the closed end of the sleeve 101, it compresses the spring 103, and the compressed spring 103 generates a restoring force. The restoring force may be used as an orthodontic force to achieve a treatment goal.

The sliding rod 105 can move bidirectionally along a receiving groove of the sleeve 101. A section of the sliding rod 105, which is close to the open end of the sleeve 101, is thinner, and the other section of the sliding rod 105 is thicker. The stop cap 107 is fixed at the open end of the sleeve 101, with an opening provided thereon, which allows the thinner section of the sliding rod 105 to pass and stops the thicker section of the sliding rod 105 from moving out the sleeve 101.

The mounting part 109 is fixed at the closed end of the sleeve 101, and the mounting part 111 is fixed at the tail end of the thinner section of the sliding rod 105. The mounting parts 109 and 111 are to mount the force applying device 100 for orthodontic treatment at a desired position. The position of the mounting part 109 on the sleeve 101 is adjustable, and the position of the mounting part 111 on the sliding rod 105 is adjustable. The length of the force applying device 100 for orthodontic treatment may be adjusted by adjusting the positions of the mounting part 109 and/or mounting part 111. First, given that the relative position between the opposite ends of the force applying device 100 for orthodontic treatment remains unchanged, the orthodontic force may be adjusted in this way; second, this broadens the scope of application of force applying device 100 for orthodontic treatment; third, this increases the tolerance for mounting error of the force applying device 100 for orthodontic treatment.

The force applying device 100 for orthodontic treatment generates an orthodontic force for an orthodontic treatment by compressing the spring 103. The force may be calculated based on the amount of compression of the spring 103. A scale 113 is provided on the thinner section of the sliding rod 105 to indicate the applied force. In this way, a medical profession can read off a force in a treatment, and determine whether the force meets the requirement of the treatment plan, and can adjust the treatment based on this. For example, the orthodontic force may be adjusted by adjusting the position of the mounting part 109 and/or 111.

The position of the stop cap 107 along the sleeve 101 is adjustable, therefore the fully extended length of the force applying device 100 for orthodontic treatment is adjustable, that is to say, the distance between the sliding rod 105 and the closed end of the sleeve 101 when the force applying device 100 for orthodontic treatment is fully extended, namely, the length of the space for receiving the spring 103 can be adjusted. As such, the spring 103 can be pre-compressed by shortening the length of the space defined by the stop cap 107 and the sleeve 101, i.e., the spring 103 generates a restoring force as being compressed when the force applying device 100 for orthodontic treatment is fully extended. The sleeve 101 is provided with a scale 115 thereon, and the restoring force generated by pre-compressing the spring 103 is indicated by the position of the stop cap 107 along the scale.

The end of the mounting part 109 is provided with a mounting hole 117, and the end of the mounting part 111 is provided with a mounting hole 119. Expansion buttons 121 and 123 may be used to fix both ends of the force applying device 100 for orthodontic treatment at desired positions. To mount the force applying device 100 for orthodontic treatment, bases of the expansion buttons 121 and 123 are fixed at predetermined positions first. Top ends of the expansion buttons 121 and 123 are large-sized, and can be compressed and springback laterally. Then the expansion buttons 121 and 123 are inserted into the mounting hole 117 of the mounting part 109 and the mounting hole 119 of the mounting part 111, respectively.

In one embodiment, various parts of the force applying device 100 for orthodontic treatment are connected by threaded connections. It is understood that they may also be connected in other manners, for example, a clip or buckle which allows relative position between the two parts to be adjusted.

In one embodiment, one of the mounting parts at opposite ends of the force applying device 100 for orthodontic treatment may be fixed, for example, it may be integrally formed with the sliding rod or the sleeve.

In one embodiment, the positions of the mounting parts may be adjusted along a first axis and a second axis. For example, the first axis may be parallel to an axis along which the sliding rod moves, and the second axis may be perpendicular to or angled with respect to the first axis. As such, the tolerance for mounting positions in certain applications of the force applying device for orthodontic treatment may be improved.

Figure 2:
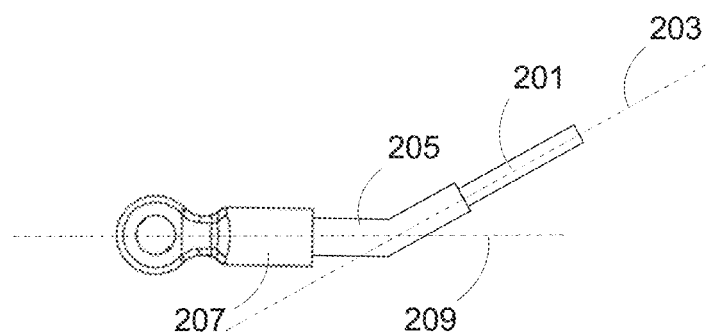
FIG. 2 schematically illustrates a mounting part according to one embodiment of the present application.

Referring to FIG. 2, it schematically illustrates the connection between the mounting part and the sliding rod according to one embodiment of the present application. The sliding rod 201 moves along an axis 201 The end of the sliding rod 201 is connected to a first end of an adapter element 205 by screw thread connection so that the position of the adapter element 205 along the sliding rod 201 can be adjusted along the axis 203. A second end of the adapter element 205 is connected to the mounting part 207 by screw thread connection so that the position of the mounting part 207 along the adapter element 205 may be adjusted along an axis 209, where the angle between the axis 203 and the axis 209 is an obtuse angle.

Figure 3A:
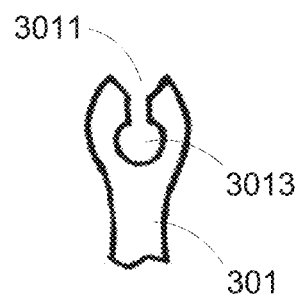
FIG. 3A schematically illustrates a mounting part according to one embodiment of the present application.

Referring to FIG. 3A, it schematically illustrates the structure of a mounting part according to one embodiment of the present application. A C-shaped clamp 3011 is provided at the end of the mounting part 301. The size of the opening of the clamp 3011 gradually reduces from the outside to the inside to guide the button into the mounting part 301 and have it locked therein. A minimum size of the opening of the clamp 3011 is smaller than the size of a hole 3013 for receiving the button.

Figure 3B:
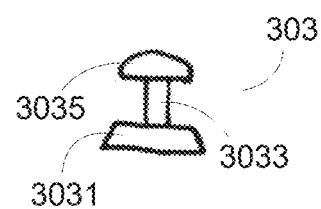
FIG. 3B schematically illustrates button for mounting the mounting part shown in FIG. 3A according to one embodiment of the present application.

Then referring to FIG. 3B, it schematically illustrates a button according to one embodiment of the present application. The button 303 comprises a base 3031, a pole 3033 extending upward from the base, and a head 3035 at the top of the pole 3033. The sizes of the base 3031 and the head 3035 are larger than that of the pole. The base 3031 is to fix the button 303 at a desired position, for example, by adhesion or welding.

To mount the force applying device for orthodontic treatment, it only needs to push the pole of the button 303, which is fixed at a desired position, into the opening of the clamp 3011 of the mounting part 301. The mounting is very quick and convenient. Since the head 3035 of the button 303 has a larger size, it prevents the mounting part 301 from uncoupling from the button along the pole 3033.

Inspired by the present application, it is understood that that in addition to generating a restoring force by compressing a spring, a restoring force may also be generated by compressing other substances such as gas.

Figure 4:
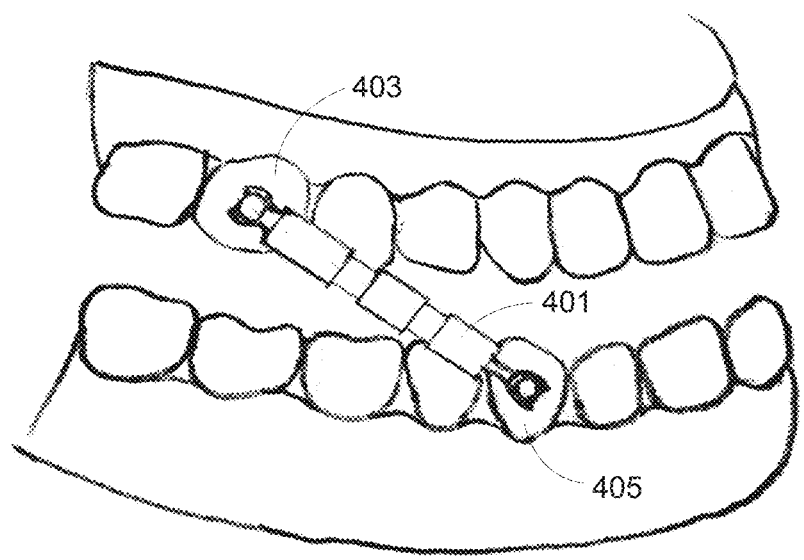
FIG. 4 schematically illustrates a dental appliance for applying a force to push a lower jaw forward according to one embodiment of the present application.

Referring to FIG. 4, it schematically illustrates using a force applying device for orthodontic treatment to push a lower jaw forward according to one embodiment of the present application. One end of the force applying device 401 for orthodontic treatment is fixed to a posterior tooth region of an upper jaw 403, and the other end is fixed to a front position on a lower jaw 405, so that upon occlusion, the force applying device 401 for orthodontic treatment is compressed and generates a restoring force, which pushes the lower jaw 405 forward. FIG. 4 only shows the force applying device 401 for orthodontic treatment provided on right buccal sides of the upper and lower jaws. However, it is understood that the force applying device for orthodontic treatment may be provided on both the left and right sides.

In one embodiment, both ends of the force applying device 401 for orthodontic treatment may be directly fixed to teeth of the upper and lower jaws. In another embodiment, both ends of the force applying device 401 for orthodontic treatment may be fixed on shell-shaped dental appliances (e.g., shell-shaped repositioners) worn on the upper and lower jaws.

Figure 5A:
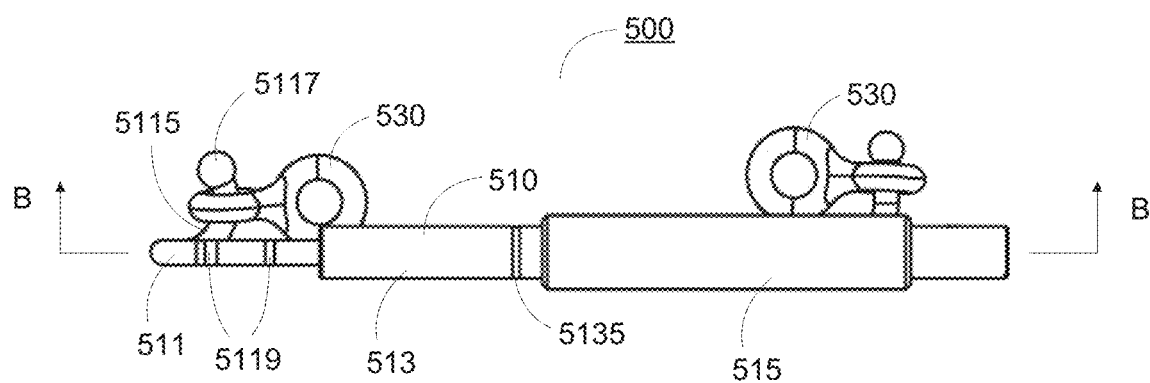
FIG. 5A schematically illustrates an assembly of a force applying device for orthodontic treatment and connectors according to one embodiment of the present application.
Figure 5B:
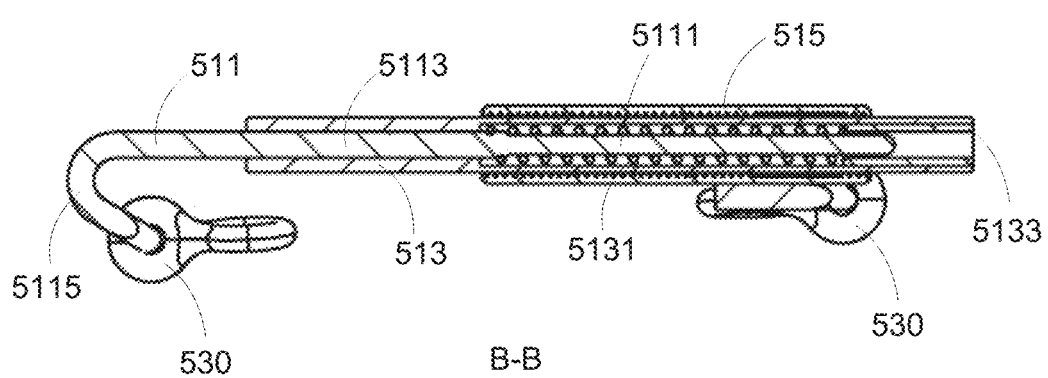
FIG. 5B schematically illustrates a cross-sectional view of the assembly of the force applying device for orthodontic treatment and the connector shown in FIG. 5A along the line B-B.
Figure 5C:
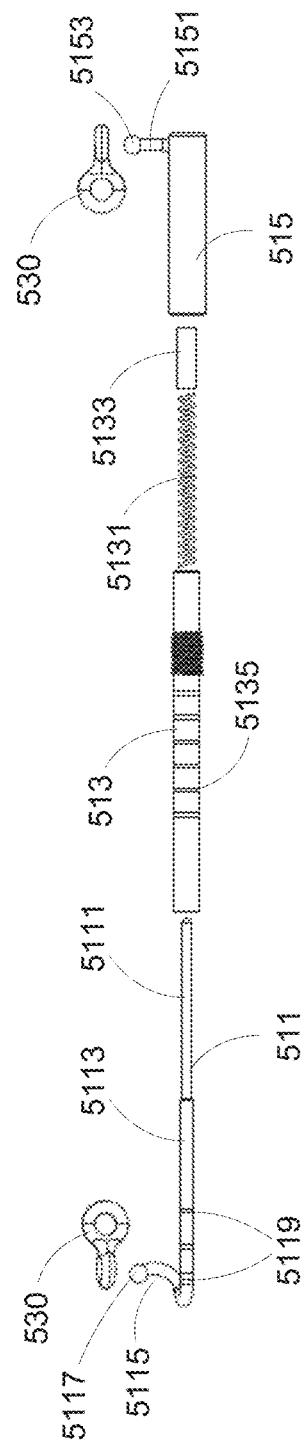
FIG. 5C is a schematic exploded view of the assembly of the force applying device for orthodontic treatment and the connector shown in FIG. 5A.

Referring to FIG. 5A, it schematically illustrates an assembly 500 of a dental force applying device and connectors according to a further embodiment of the present application. Then referring to FIG. 5B, it schematically illustrates a cross-sectional view of the assembly 500 of the dental force applying device and connectors shown in FIG. 5A. Then referring to FIG. 5C, it schematically illustrates an exploded view of the assembly 500 of the dental force applying device and connectors shown in FIG. 5A. The assembly 500 of the dental force applying device and connectors comprises a dental force applying device 510 and two connectors 530.

The dental force applying device 510 comprises a sliding rod 511, an inner sleeve 513 and an outer sleeve 515. A first section 5111 of the sliding rod 511 close to a first end (the end close to the inner sleeve 513) is thinner, a second section 5113 close to a second end opposite to the first end is thicker, an arm 5115 is formed at the end of the second section 5113, and an enlarged part 5117 is formed at the end of the arm 5115. The second section 5113 is provided with a scale 5119 marking a desired range of applied force. If a first end (the end close to the sliding rod 511) of the inner sleeve 513 is within the range of the scale, this indicates that the force applied is within the desired range, otherwise it needs to be adjusted.

A spring 5131 is received and retained in the inner sleeve 513, and a force is applied by compressing the spring 5131. The sliding rod 511 is partially received in the inner sleeve 513, and they can move relative to each other along an axis. The first section 5111 of the sliding rod 511 can run through the spring 5131, and the outer diameter of the second section 5113 is larger than the inner diameter of the spring 5131, so that the second section 5113 can push and compress the spring 5131. Both ends of the inner sleeve 513 are open so that the first section 5111 of the sliding rod 511 can go through the second end (the end opposite to the first end) of the inner sleeve 513, therefore the spring 5131 can be compressed more. Meanwhile, this structure can reduce the size of the dental applying force along longitudinal direction.

In one embodiment, the spring 5131 may be placed in the inner sleeve 513, and then an end cap 5133 is fixed to the inner sleeve 513 by welding or screw thread connection, to retain the spring 5131 within the inner sleeve 513. A step is formed on both ends of the cavity between the inner sleeve 513 and the end cap 5133 for receiving the spring 5131, to keep the spring 5131 within the cavity.

The inner sleeve 513 is partially received in the outer sleeve 515, they are connected by screw thread connection so that relative position between them is adjustable. A scale 5135 is provided on a section of the inner sleeve 513, which section is close to the sliding rod 511, and relative position between the inner sleeve 513 and the outer sleeve 515 can be adjusted with reference to the scale 5135. An arm 5151 extends from the outer surface of the outer sleeve 515, and an enlarged part 5153 is formed at the end of the arm 5151.

Figure 6:
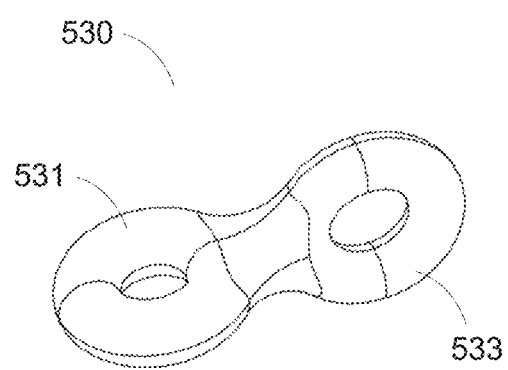
FIG. 6 schematically illustrates the connector shown in FIG. 5A.

Referring to FIG. 6, it shows the connector 530 shown in FIG. 5A.

In one embodiment, the connector 530 is integrally formed and substantially 8-shaped. Along a central axis in a longitudinal direction of the 8-shape, two loops of the 8-shape are twisted relative to each other by an angle. The two loops respectively constitute a first connecting part 531 and a second connecting part 533. The first connecting part 531 is fitted over the arms 5115 and 5151 of the dental force applying device 510. The enlarged parts 5117 and 5153 formed at the ends of the arms 5115 and 5151 can prevent the first connecting part 531 from disengaging from the arms 5115 and 5151. The second connecting part 533 is fitted over the button 303 shown in FIG. 3B which is fixed on a tooth or a shell-shaped dental appliance. In this way, both ends of the dental force applying device 500 can be connected to the upper and lower jaws, respectively.

In one embodiment, to use the dental force applying device 500, the upper and lower jaws may be kept in occlusal state, then observe whether the first end of the inner sleeve 513 is within the range marked by the scale 5119 on the sliding rod 511. If the first end of the inner sleeve 513 is not within the range, the applied force may be adjusted by rotating the inner sleeve 513. Furthermore, due to the relationship between the sliding rod 511, the inner sleeve 513 and the outer sleeve 515, the adjustment may be completed when the dental force applying device 510 is connected to teeth or shell-shaped dental appliances, which is very convenient.

In one embodiment, the connector 530 may be made of a material with an elastic modulus within a range of 50-300 MPa, such as Thermoplastic Polyurethane (TPU), Polycarbonate (PC), and Polypropylene (PP), Polyethylene Terephthalate (PETG), Polyoxymethylene (POM), Acrylonitrile Butadiene Styrene (ABS) and Ethylene Vinyl Acetate (EVA) etc. In this way, the first connecting part 531 and the second connecting part 533 can be expanded and restored elastically, therefore they can be mounted and removed conveniently.

The inner diameter of the first connecting part 531 of the connector 530 is greater than or equal to the diameter of the arms 5115 and 5151, and smaller than the sizes of the enlarged parts 5117 and 5153. To connect the dental force applying device, the enlarged parts 5117 or 5153 are pressed into the loop of the first connecting part 531 of the connector 530 so that the loop is expanded; after the enlarged parts pass through the loop of the first connecting part 531, the loop restores to the original size, thereby preventing the first connecting part 531 from disengaging from the arms 5115 or 5151.

In one embodiment, centers and joint of the first connecting part 531 and the second connecting part 533 of the connector 530 may be on the same straight line. In another embodiment, a line that goes through the center of the first connecting part 531 and the joint of the two connecting parts and a line that goes through the center of the second connecting part 533 and the joint of the two connecting parts may be parallel to each other. In a further embodiment, the line that goes through the center of the first connecting part 531 and the joint of the two connecting parts may be angled with respect to the line that goes through the center of the second connecting part 533 and the joint of the two connecting parts.

Inspired by the present application, it is understood that the relative positional relationship between the first connecting part 531 and the second connecting part 533 of the connector 530 is not limited to the above embodiments, and it may be any other configuration as long as it is suitable for a specific application. In one embodiment, an angle between planes where the first connecting portion 531 and the second connecting portion 533 lie may be greater than or equal to 30° and less than or equal to 90°.

Inspired by the present application, it is understood that the force applying device of the present application may be used not only for orthodontic treatments, but also for any other applicable intraoral medical applications.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

We claim:

1. A force applying device for orthodontic treatment, which is elastically expandable and is configured to generate a restoring force as an orthodontic force for an orthodontic treatment when compressed, the force applying device comprising:
a first element and a second element capable of moving relative to each other along a first axis, wherein the force applying device for orthodontic treatment is compressed when the first element and second element move towards each other along the first axis,
a first arm extending laterally from a first end of the first element, wherein the first end is spaced away from the second element,
a first connector having a first connecting part fitted over the first arm and a second connecting part configured to be fitted over a button fixed on a first jaw, to connect the first element to the first jaw,
wherein the first connecting part and the second connecting part are toroidal in shape and are twisted relative to each other about a longitudinal axis of the first connector by a first angle, wherein a second arm extends outward from the second element, and the force applying device further comprises a second connector comprising a first connecting part fitted over the second arm and a second connecting part which are toroidal in shape, and the second connecting part of the second connector is configured to be fitted over a button fixed on a second jaw opposite to the first jaw, to connect the second element to the second jaw, and wherein the first element is a sliding rod, the second element comprises an inner sleeve, an outer sleeve and a spring, where the spring is received in the inner sleeve and is configured to be pushed and compressed by the sliding rod, the outer sleeve is fitted over the inner sleeve, the outer sleeve is connected to the inner sleeve by a screw thread connection, the second arm extends outward from the outer sleeve, and the sliding rod is partially received in the inner sleeve.

2. The force applying device for orthodontic treatment of claim 1, wherein the first angle is greater than or equal to 30° and less than or equal to 90°.

3. The force applying device for orthodontic treatment of claim 1, wherein an enlarged part is formed at the end of the first arm to prevent the first connecting part from disengaging from the first arm.

4. The force applying device for orthodontic treatment of claim 1, wherein the first connecting part and second connecting part of the second connector are twisted relative to each other about a longitudinal axis of the second connector by a second angle.

5. The force applying device for orthodontic treatment of claim 4, wherein the second angle is greater than or equal to 30° and less than or equal to 90°.

6. The force applying device for orthodontic treatment of claim 1, wherein an enlarged part is formed at the end of the second arm to prevent the second connecting part from disengaging from the second arm.

7. The force applying device for orthodontic treatment of claim 1, wherein the first element is provided with a scale marking a desired range of applied force.

8. The force applying device for orthodontic treatment of claim 1, wherein the transverse size of a first section of the sliding rod, which is close to the inner sleeve, is smaller than the inner diameter of the spring, the first section extends through the spring, and a transverse size of a second section of the sliding rod, which is away from the inner sleeve, is greater than the inner diameter of the spring such that the sliding rod is able to push the spring to compress the spring.

9. The force applying device for orthodontic treatment of claim 8, wherein both ends of the inner sleeve are open such that the first section of the sliding rod passes through the inner sleeve and the second section of the sliding rod is elongated such that the second section extends outwardly of the inner sleeve.

10. The force applying device for orthodontic treatment of claim 1, wherein a scale is provided on the inner sleeve as reference for adjusting relative position between the inner sleeve and the outer sleeve.

11. The force applying device for orthodontic treatment of claim 1, wherein a step is formed on both ends of a cavity of the inner sleeve for receiving the spring, to retain the spring within the cavity.

12. The force applying device for orthodontic treatment of claim 1, wherein the first connector is a one-piece element.

* * * * *

UNITED STATES PATENT AND TRADEMARK OFFICE
CERTIFICATE OF CORRECTION

PATENT NO. : 12,318,262 B2
APPLICATION NO. : 17/553028
DATED : June 3, 2025
INVENTOR(S) : Bing Fang et al.

It is certified that error appears in the above-identified patent and that said Letters Patent is hereby corrected as shown below:

On the Title Page

At (73) please delete "Shanghai Ninth People's Hospital, Shanghai Jiaotong University" and insert --Shanghai Ninth People's Hospital, Shanghai Jiaotong University School of Medicine--.

Signed and Sealed this
Third Day of February, 2026

John A. Squires
*Director of the United States Patent and Trademark Office*